(12) United States Patent
Shin (10) Patent No.: US 8,583,196 B2
(45) Date of Patent: Nov. 12, 2013

(54) SLIDE-TYPE PORTABLE TERMINAL

(75) Inventor: Yun-Sung Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 13/098,753

(22) Filed: May 2, 2011

(65) Prior Publication Data

US 2012/0202567 A1 Aug. 9, 2012

(30) Foreign Application Priority Data

Feb. 7, 2011 (KR) .................. 10-2011-0010816

(51) Int. Cl.
*H04M 1/00* (2006.01)

(52) U.S. Cl.
USPC ...................................... 455/575.4

(58) Field of Classification Search
USPC ...................................... 455/575.4
See application file for complete search history.

(56) References Cited

U.S. PATENT DOCUMENTS

| | | | | |
|---|---|---|---|---|
| 2005/0009581 A1* | 1/2005 | Im et al. | ...... | 455/575.4 |
| 2005/0054398 A1* | 3/2005 | Kim | ...... | 455/575.4 |
| 2005/0113154 A1* | 5/2005 | Park et al. | ...... | 455/575.4 |
| 2005/0164753 A1* | 7/2005 | Kato | ...... | 455/575.4 |
| 2006/0025184 A1* | 2/2006 | Cho et al. | ...... | 455/575.4 |
| 2006/0046796 A1* | 3/2006 | Park et al. | ...... | 455/575.4 |
| 2006/0073858 A1* | 4/2006 | Nagashima | ...... | 455/575.4 |
| 2006/0223596 A1* | 10/2006 | Hur | ...... | 455/575.4 |
| 2007/0032278 A1* | 2/2007 | Lee et al. | ...... | 455/575.4 |
| 2007/0060220 A1* | 3/2007 | Hsu | ...... | 455/575.4 |
| 2008/0090627 A1* | 4/2008 | Jeong et al. | ...... | 455/575.4 |
| 2008/0146297 A1* | 6/2008 | Ho | ...... | 455/575.4 |
| 2008/0274776 A1* | 11/2008 | Cho et al. | ...... | 455/575.4 |
| 2009/0149229 A1* | 6/2009 | Li et al. | ...... | 455/575.4 |
| 2009/0156274 A1* | 6/2009 | Wang | ...... | 455/575.4 |
| 2009/0247247 A1* | 10/2009 | Jang | ...... | 455/575.4 |
| 2009/0247248 A1* | 10/2009 | Ito | ...... | 455/575.4 |
| 2010/0016042 A1* | 1/2010 | Shim et al. | ...... | 455/575.4 |
| 2010/0113109 A1* | 5/2010 | Dai et al. | ...... | 455/575.4 |
| 2010/0151924 A1* | 6/2010 | Amano | ...... | 455/575.4 |
| 2010/0323769 A1* | 12/2010 | Peng et al. | ...... | 455/575.4 |
| 2011/0195761 A1* | 8/2011 | Lee | ...... | 455/575.4 |

* cited by examiner

*Primary Examiner* — Nathan Mitchell
(74) *Attorney, Agent, or Firm* — Jefferson IP Law, LLP (57) ABSTRACT

A portable terminal is provided. The portable terminal includes a first housing, a second housing coupled to the first housing to face the first housing, the second housing being linearly movable to expose or cover a part of the first housing, a rear case coupled to a rear face of the second housing, an opening formed through the rear case, and a slide module comprising a guide member mounted on the first housing, and a slide member coupled to and linearly movable with respect to the guide member, the slide member being coupled to the opening to close the rear face of the second housing. With the slide-type portable terminal, since the opening, in which the slide member can be mounted regardless of the external appearance of the terminal, is formed through the rear case in the opening so that the first and second housings can be slidably coupled to one another, the manufacturing cost of the portable terminal can be reduced.

20 Claims, 7 Drawing Sheets

SLIDE-TYPE PORTABLE TERMINAL

PRIORITY

This application claims the benefit under 35 U.S.C. §119(a) of a Korean patent application filed in the Korean Intellectual Property Office on Feb. 7, 2011 and assigned Serial No. 10-2011-0010816, the entire disclosure of which is hereby incorporated by reference.

BACKGROUND OF THE INVENTION

1. Field of the Invention

The present invention relates to a portable terminal. More particularly the present invention relates to a slide-type portable terminal in which a pair of housings are coupled to each other to be linearly movable while facing each other.

2. Description of the Related Art

In general, a portable terminal is a device that allows a user to perform a mobile communication function while the user is moving. The portable terminal is classified into a bar-type terminal, a flip-type terminal, or a folder-type terminal in accordance with its external appearance.

A bar-type terminal is a type having data input and output means, and transmitter and receiver units in a single body housing. Since a keypad serving as the data input means is always exposed to the outside, malfunction may be caused in such a bar-type terminal. In addition, since the bar-type terminal has a problem in securing a distance between the transmitter unit and the receiver unit, there is a limit to which the bar-type terminal can be miniaturized.

A flip-type terminal is a type having a body, a flip, and a hinge module for interconnecting the body and the flip, in which data input and output means, and transmitter and receiver units are installed in the body. Since the flip covers a keypad serving as the data input means, it is possible to prevent malfunction. However, since the flip-type terminal also has a problem in securing a distance between the transmitter unit and the receiver unit, there is a limit to which the flip-type terminal can be miniaturized.

A folder-type terminal is a type having a body, a folder, and a hinge module for interconnecting the body and the folder, the folder-type terminal being opened or closed by rotating the folder. In a standby mode, the folder is in close contact with the body, which can prevent the malfunction of a keypad, and in a communication mode, the folder is unfolded, which makes it possible to secure a sufficient distance between the transmitter unit and the receiver unit, which is advantageous for miniaturization.

As the designs of portable terminals have been diversified, slide-type portable terminals have appeared. Such a slide-type portable terminal has two housings, wherein one of the housings is slid on the other housing so as to open or close the portable terminal.

Figure 1:
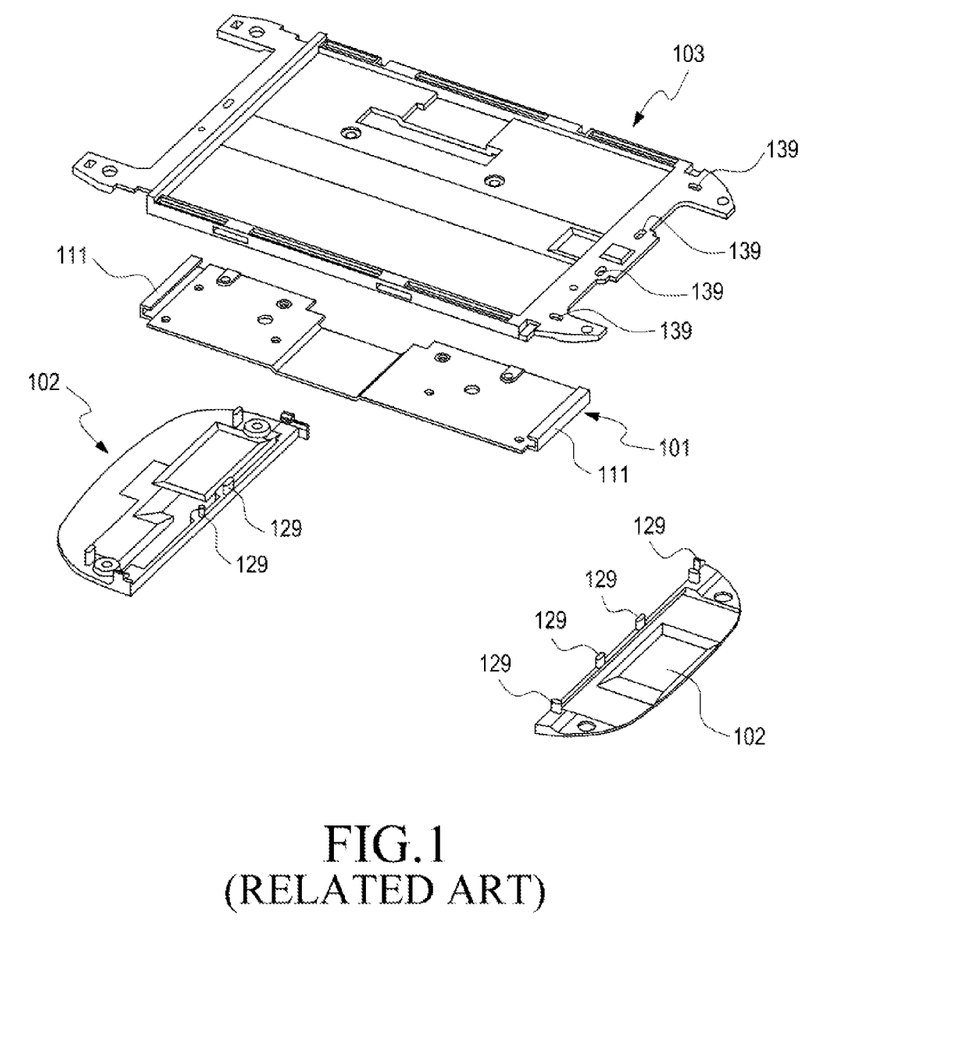
FIG. 1 is an exploded perspective view showing a slide coupling arrangement of a slide-type portable terminal according to the related art.

FIG. 1 is an exploded perspective view showing a slide coupling arrangement of a slide-type portable terminal according to the related art.

Referring to FIG. 1, the slide coupling arrangement is adapted to interconnect first and second housings of a terminal (not shown) to face each other. The slidable coupling arrangement has a guide member 101 mounted on the first housing, and a slide member 103 mounted on the second housing.

The guide member 101 has a pair of guide ribs 111 formed by bending both ends of the guide member 101 to face each other, and the slide member 103 has guide rails (not shown) on one surface thereof. The guide ribs 111 are slidably engaged with the guide rails in such a manner that the guide ribs 111 wrap the guide rails, respectively. As a result, the guide member 101 and the slide member 103 slidably connect the first and second housings.

Since the guide member 101 and the slide member 103 should connect the first and second housings as well as guide the sliding movement of the first and second housings, they are preferably formed from a metallic material so as to prevent them from being fractured or damaged by external impact or force. If the slide-type portable terminal, to which the guide member 101 and the slide member 103 are applied, is a mobile communication terminal, it is desired to minimize the size of the slide member 103. This is to reduce the influence of the metallic slide member to an antenna device.

In a terminal having the slidable coupling arrangement as described above, an antenna device is positioned in the inside of one end of the second housing, on which the slide member 103 is mounted, and at the antenna device installed part, the housing is finished by an injection-molded element of a synthetic resin material, if possible. Therefore, synthetic resin covers 102 are positioned on both ends of the slide member 103, respectively.

Figure 2:
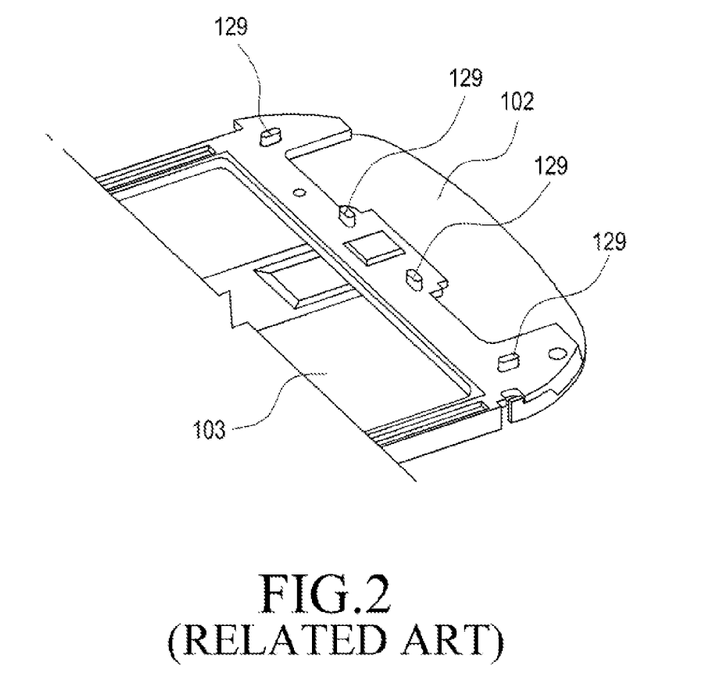
FIG. 2 is a perspective view showing the cover of the second housing in a state in which the cover is coupled to the slide member shown in FIG. 1.
Figure 3:
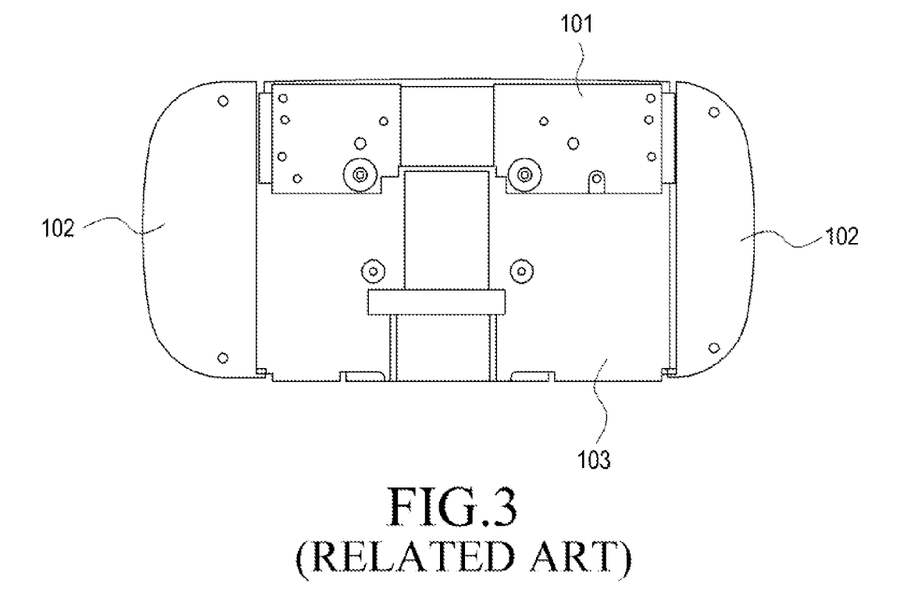
FIG. 3 is a top plan view showing the slide coupling arrangement shown in FIG. 1.

FIG. 2 is a perspective view showing the cover of the second housing in a state in which the cover is coupled to the slide member shown in FIG. 1. FIG. 3 is a top plan view showing the slide coupling arrangement shown in FIG. 1.

Referring to FIGS. 2 and 3, each of the covers 102 is formed with fastening studs 129, and each of the ends of the slide member 103 is formed with fastening holes 139 corresponding to the stud protrusions 129, respectively. If the covers 102 are coupled to the slide member 103, the ends of the fastening studs 129 protrude to the inner surface of the slide member 103 as shown in FIG. 2. In a state in which the covers 102 are coupled to the slide member 103 in this manner, the ends of the fastening studs 129 are fused to anchor the covers 102 to the slide member 103.

With such a conventional slide coupling arrangement, since the slide member, the guide member and the covers should be re-designed if the external appearance of the terminal is deformed, it is difficult to commonly use such a slide module formed by the guide member and the slide member, and the manufacturing cost of such a terminal is increased.

Furthermore, since the slide member and the covers are anchored only by fusion of the fastening studs, all of them should be replaced even if one of them is damaged. Replacing one or more undamaged parts will incur unnecessary repair cost.

In addition, if the fastening studs or fused parts are damaged, the covers are moved, which may lead to damage, such as scratching, due to the interference between the covers and other parts during the sliding movement.

SUMMARY OF THE INVENTION

Aspects of the present invention are to address at least the above-mentioned problems and/or disadvantages and to provide at least the advantages described below. Accordingly, an aspect of the present invention is to provide a slide-type portable terminal having a slide module which is easy to commonly use, whereby the manufacturing cost of the portable terminal can be reduced.

Another aspect of the present invention is to provide a slide-type portable terminal which is configured in such a manner that elements of the portable terminal are rigidly coupled, and when any one of the elements is damaged, only the damaged element can be replaced among the coupled elements, whereby repair cost can be saved.

Still another aspect of the present invention is to provide a slide-type portable terminal which has a rigid slide coupling arrangement which can prevent damage, such as scratching, that may be caused by a movement of a certain element.

In accordance with an aspect of the present invention, a portable terminal having a first housing, and a second housing coupled to the first housing to face the first housing, the second housing being linearly movable to expose or cover a part of the first housing is provided. The portable terminal includes a rear case coupled to a rear face of the second housing, an opening formed through the rear case, and a slide module including a guide member mounted on the first housing, and a slide member coupled to and linearly movable with respect to the guide member, the slide member being coupled to the opening to close the rear face of the second housing.

The portable terminal may further include fastening pieces extending from at least one side edge of the slide member, fastening holes formed adjacent to edges of the opening on an inner surface of the rear case, and screws extending through the fastening pieces and fitted to the fastening holes, respectively, to fasten the slide member to the rear case.

In addition, the slide module may further include a pair of guide rails formed on one surface of the slide member, and a pair of guide ribs respectively formed at side ends of the guide member, the guide ribs being slidably engaged with the guide rails in a state in which the guide ribs wrap the guide rails, respectively.

Also, the guide rails may be exposed to a rear surface of the second housing through the opening.

The slide module may further include shock-absorbing members respectively mounted on ends of the guide rails, the guide member coming into contact with the shock-absorbing members as the slide member is slid and arrives at one end of the guide rails.

The slide module may further include at least one elastic member, one end of which is supported on the guide member, and the other end of which is supported on the slide member, wherein the at least one elastic member may provide an elastic force for urging the both ends of the at least one elastic member away from each other.

In accordance with another aspect of the present invention, a portable terminal is provided. The portable terminal includes a first housing, and a second housing coupled to the first housing to face the first housing, the second housing being linearly movable to expose or cover a part of the first housing. The portable terminal further includes a rear case coupled to a rear face of the second housing, an opening formed through the rear case, a slide module including a guide member mounted on the first housing, and a slide member coupled to and linearly movable with respect to the guide member, the slide module being coupled to the opening in such a manner that the rear case surrounds a periphery of the slide member.

The width of the slide member in a sliding direction of the second housing is less than the width of the rear case in the sliding direction of the second housing.

The portable terminal may further include fastening pieces extending from at least one side edge of the slide member, fastening holes formed adjacent to edges of the opening on an inner surface of the rear case, and screws extending through the fastening pieces and fitted to the fastening holes, respectively, to fasten the slide member to the rear case.

The slide module may further include a pair of guide rails formed on one surface of the slide member and a pair of guide ribs respectively formed at side end parts of the guide member, the guide ribs being slidably engaged with the guide rails in a state in which the guide ribs wrap the guide rails, respectively.

With the slide-type portable terminal configured as described above, since the opening, in which the slide member can be mounted regardless of the external appearance of the terminal, is formed through the rear case so that the first and second housings can be slidably coupled to one another, the manufacturing cost of the portable terminal can be reduced. Moreover, since it is not necessary to re-design the slide module in accordance with the external appearance of the terminal, the manufacturing cost of the terminal can be further reduced. In addition, since the slide module and injection-molded elements are coupled using screws, it is possible to replace only a damaged element when such an element is damaged, whereby repair cost can be saved. In addition, since it is possible to use metallic insert elements inserted in an injection-molded element, and screws when assembling the injection molded elements and the slide module, the coupled structure is rigid, whereby any movement of the elements can be prevented and damage, such as scratching, caused by sliding movement can be prevented.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 4:
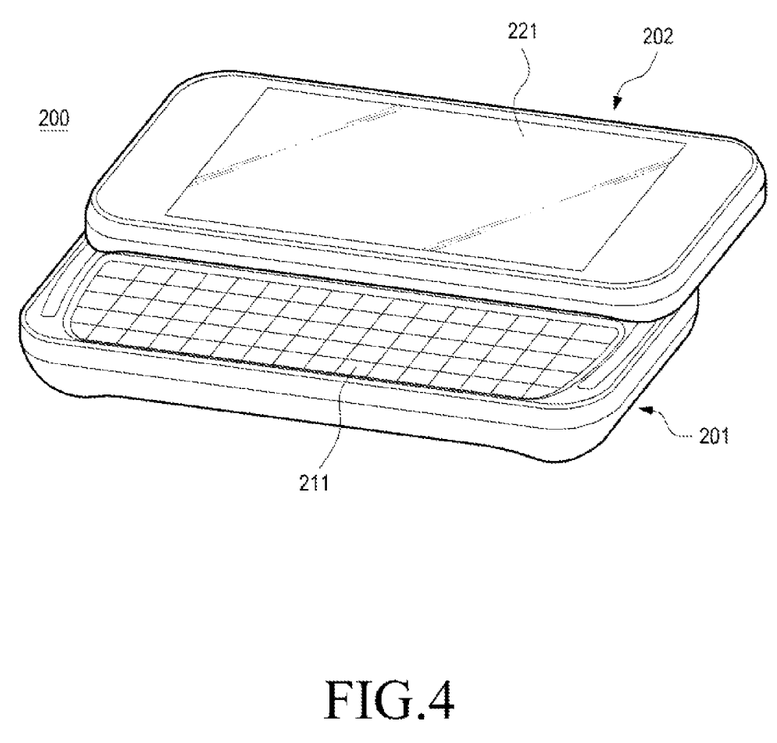
FIG. 4 is a perspective view showing a slide-type portable terminal in accordance with an exemplary embodiment of the present invention.

FIG. 4 is a perspective view showing a slide-type portable terminal in accordance with an exemplary embodiment of the present invention.

Referring to FIG. 4, the inventive slide-type portable terminal 200 includes a first housing 201, and a second housing 202 coupled to the first housing 201 to face one surface of the first housing 201, the second housing 202 being linearly movable widthwise.

Although not shown in the drawing, the second housing 201 is equipped with a battery pack on the rear face thereof, and houses a circuit board provided with communication and control circuits. A keypad 211 is provided on the front face of the first housing 201, which is opened or closed by the sliding movement of the second housing 202. That is, as the second housing 202 is slid, a part of the second housing 201 is opened or closed.

A display device 221 is mounted on the front face of the second housing 202. The display device 221 is fabricated using a touch screen, which may provide a means for enabling user input in addition to the keypad 211. Although not shown, if a receiver unit and a transmitter unit are installed adjacent to the display device 221, it will be possible for a user to conduct voice communication, using the terminal.

Figure 5:
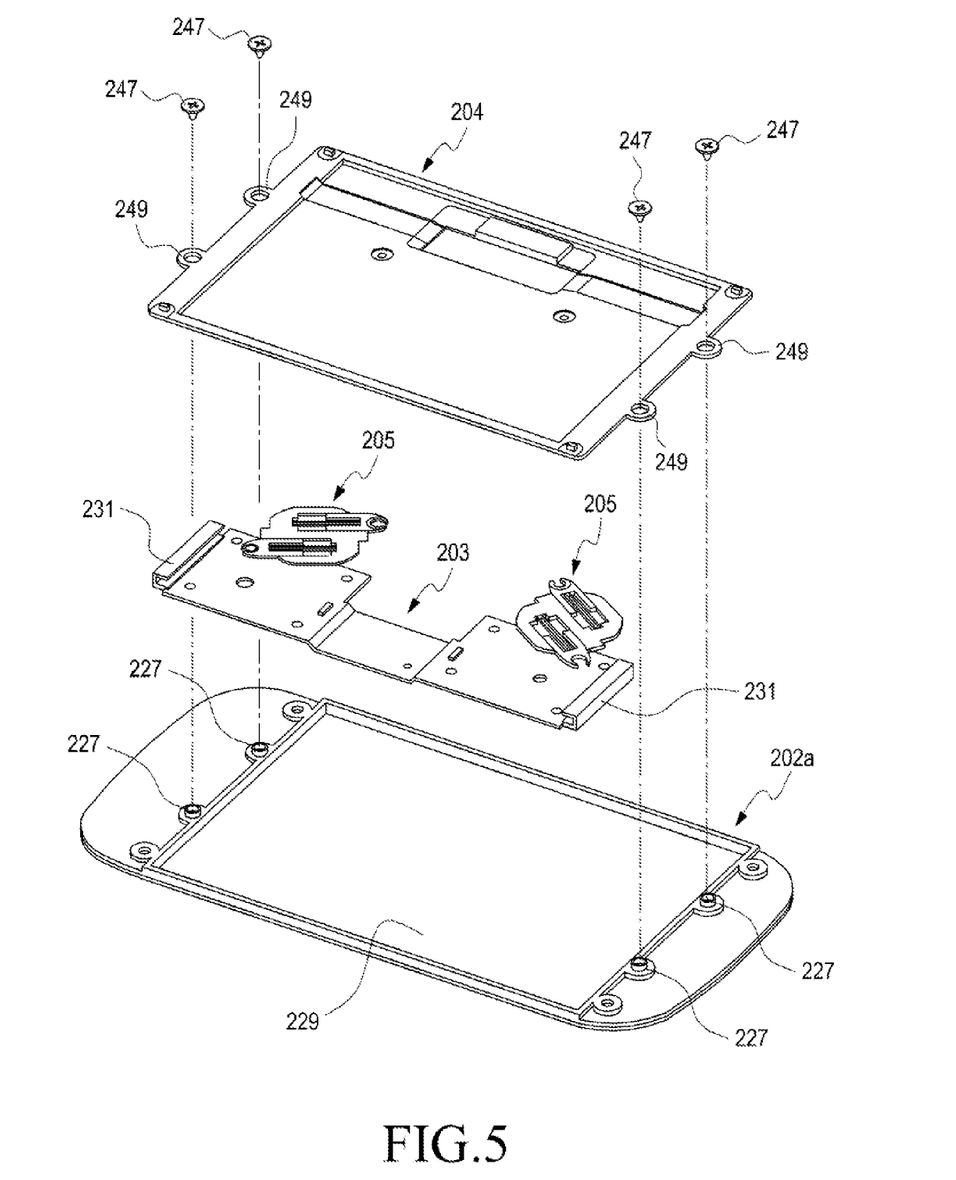
FIG. 5 is an exploded perspective view showing the slide coupling arrangement of the slide-type portable terminal shown in FIG. 4 in accordance with an exemplary embodiment of the present invention.
Figure 6:
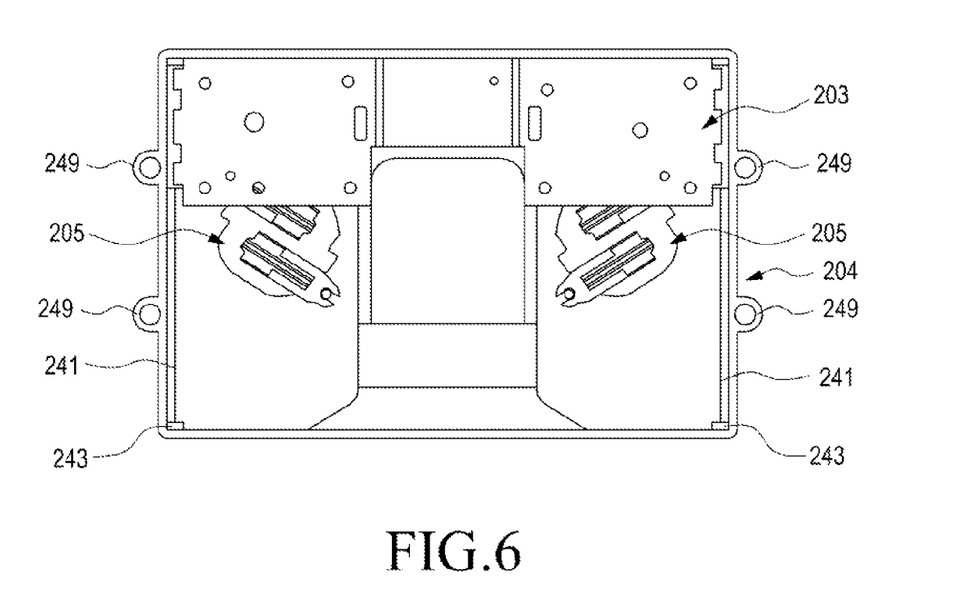
FIG. 6 is a top plan view showing the slide module of the slide-type portable terminal shown in FIG. 5 in accordance with an exemplary embodiment of the present invention.
Figure 7:
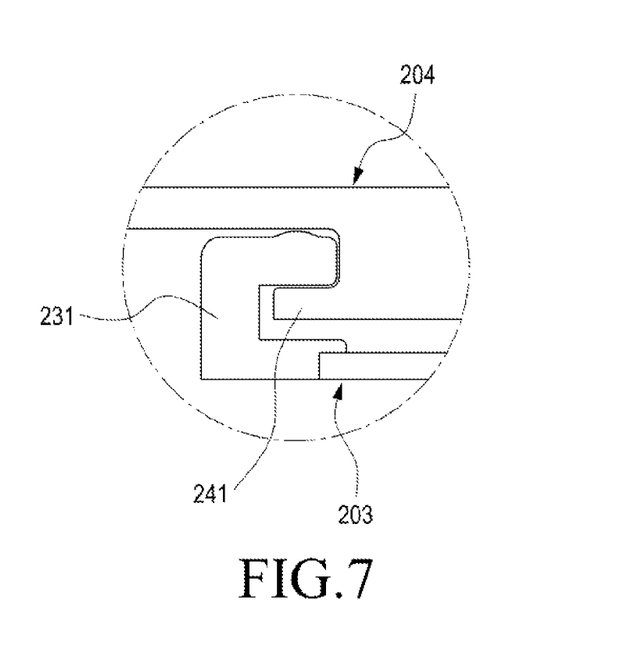
FIG. 7 is a side view showing a slide coupling part of a slide module in accordance with an exemplary embodiment of the present invention.
Figure 8:
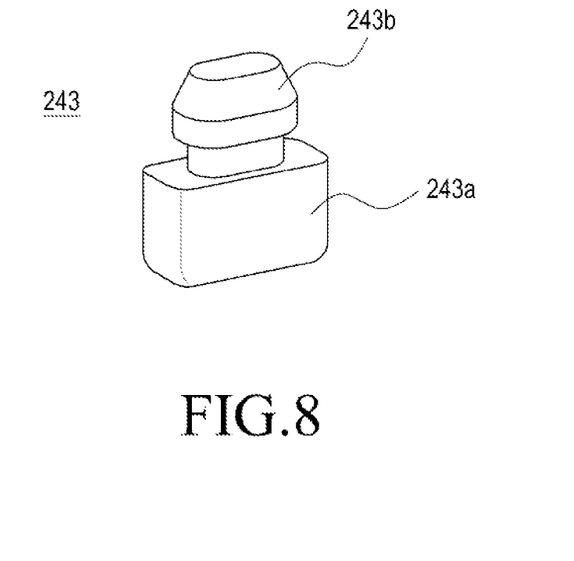
FIG. 8 is a perspective view showing a shock-absorbing member of the slide module shown in FIG. 6 in accordance with an exemplary embodiment of the present invention.
Figure 9:
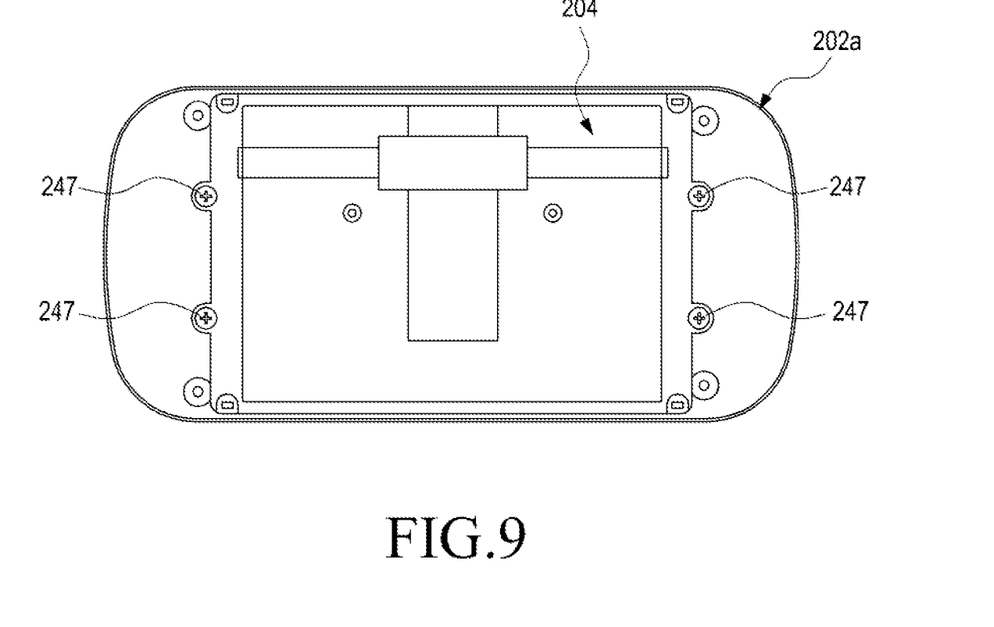
FIG. 9 is a view showing the inner surface of the slide coupling arrangement shown in FIG. 5 in accordance with an exemplary embodiment of the present invention.
Figure 10:
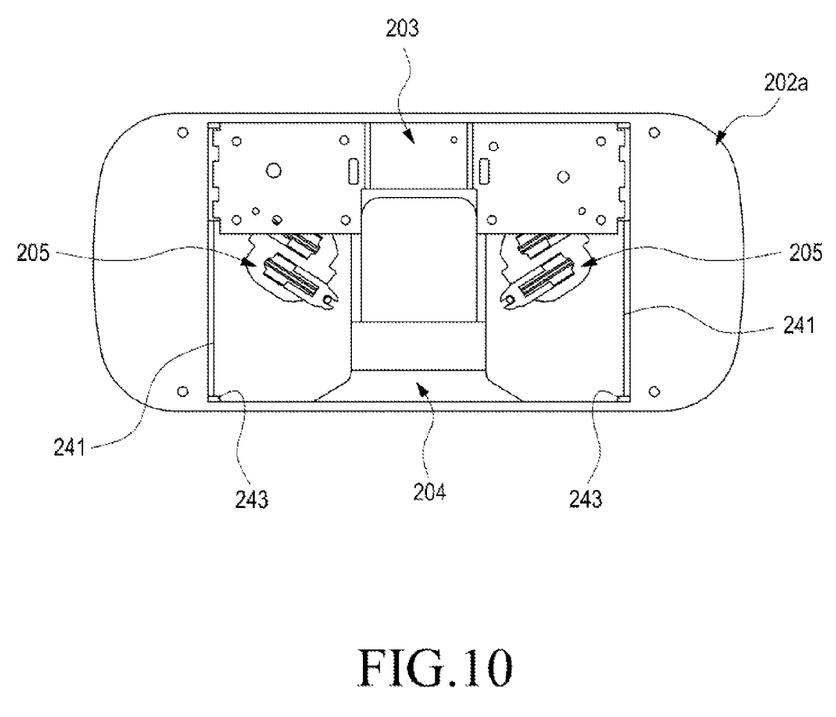
FIG. 10 is a view showing the outer surface of the slide coupling arrangement shown in FIG. 5 in accordance with an exemplary embodiment of the present invention.

FIG. 5 is an exploded perspective view showing the slide coupling arrangement of the slide-type portable terminal shown in FIG. 4 in accordance with an exemplary embodiment of the present invention. FIG. 6 is a top plan view showing the slide module of the slide-type portable terminal shown in FIG. 5 in accordance with an exemplary embodiment of the present invention. FIG. 7 is a side view showing a slide coupling part of a slide module in accordance with an exemplary embodiment of the present invention. FIG. 8 is a perspective view showing a shock-absorbing member of the slide module shown in FIG. 6 in accordance with an exemplary embodiment of the present invention. FIG. 9 is a view showing the inner surface of the slide coupling arrangement shown in FIG. 5 in accordance with an exemplary embodiment of the present invention. FIG. 10 is a view showing the outer surface of the slide coupling arrangement shown in FIG. 5 in accordance with an exemplary embodiment of the present invention.

Hereinbelow, the slide coupling arrangement of the first and second housings 201 and 202 will be described with reference to FIGS. 5 to 10. The slide coupling arrangement of the terminal 200 includes a slide module formed by a guide member 203 and a slide member 204, in which an opening 229 for mounting the slide member 204 is provided in a rear case 202a of the second housing 202.

The guide member 203 is mounted on one face of the first housing 201. More specifically, the guide member 203 is mounted at a side of a key pad 211 installed on the front face of the first housing 201, in which the guide member 203 is always concealed by the second housing 202 regardless of the sliding movement of the second housing 202. Both end parts of the guide member 203 are bent to face each other to form guide ribs 231.

The slide member 204 is mounted in the opening 229 to cover the rear face of the second housing 202 in cooperation with the rear case 202a. As a result, the slide member 204 is arranged to be surrounded by the rear case 202a. In other words, the width of the slide member 204 in the siding direction of the second housing 202 is smaller than the width of the rear case 202a. Therefore, even if the design of the terminal is changed, it is possible to commonly use the inventive slide member by fabricating only the rear case to conform to the design-changed terminal, and forming an opening corresponding to the slide member 204 in the rear case. Guide rails 241 (see FIGS. 6 and 7) are formed on one face of the slide member 204. The guide rails 241 extend in the linear movement direction of the second housing 202, and are slidably engaged with the guide ribs 231, respectively.

FIG. 7 shows that one of the guide rails 241 is engaged with one of the guide ribs 231. As shown in FIG. 7, the guide rail 241 protrudes from one face of the slide member 204 and then the guide rail 241 is bent to face the one face of the slide member 204. A part of the guide rib 231 is positioned between the one face of the guide member 204 and the guide rail 241, and the guide rail 241 is positioned between the guide rib 231 and the one face of the guide member 203, so that the guide rib 231 and the guide rail 241 are engaged with each other. Consequently, the slide member 204 is coupled to the guide member 203 to be movable only in the linear movement direction of the second housing 202.

In order to couple the slide member 204 to the opening 229, fastening pieces 249 are formed on the slide member 204, and fastening holes 227 are formed on the rear case 202a. The fastening pieces 249 extend from both side edges of the slide member 204, respectively, and the fastening holes 227 are formed in the process of injection-molding the rear case 202a. The fastening holes 227 are positioned adjacent to both side edges of the opening 229, and formed on the inner surface of the rear case 202a.

If the slide member 204 is positioned in the opening 229, the fastening pieces 249 are positioned to face to the fastening holes, 227, respectively. With the screws 247 extending through the fastening pieces 249 and fitted to the fastening holes, respectively, the slide member 204 is fastened to the rear case 202 in the terminal 200. If the fastening holes 227 are formed, metallic insert members may be inserted into the injection-molded product to form threads through the insert members. If the fastening holes 227 are formed through the metallic insert members, the screws 247 can be more rigidly fastened. If the slide member 204 is fastened to the rear case 202a, the guide rails 241 are exposed to the outside of the rear case 202a, more specifically to the rear face of the second housing 202.

The slide module may further include at least one elastic member 205 for providing a driving force for urging the slide member 204 to be linearly moved. Although the elastic member 205 may be formed in various shapes, it is desired that the elastic member provides elastic forces biasing both ends away from each other. One end of the elastic member 205 is supported on the guide member 203 and the other end is supported on the slide member 204. If the slide member 204 is slid, the elastic member 205 pivots, and the other end of the elastic member 205 is linearly moved on the first housing 201. Upon being linearly moved on the first housing 201, the other end of the elastic member 205 is moved toward or away from the one end of the elastic member 205, in which the closest point of both ends of the elastic member 205 is preferably positioned within the movement area of the slide member 204.

In terminal 200 configured as described above, the slide member 204 is linearly moved between a first point at which the keypad 211 is fully closed, and a second point at which the key pad 211 is fully opened. Assuming that the closest point of both ends of the elastic member 205 in the movement area between the first and second points is a third point, between the first and third points, the elastic force of the elastic member 205 is applied as a driving force for urging the slide member 204 to the first point. On the contrary, between the second and third points, the elastic force of the elastic member 205 is applied as a driving force for urging the slide member 204 to the second point.

Therefore, unless the slide member 204 is stopped at the third point, the elastic member 204 will provide a driving force for urging the slide member 204, and hence the second housing 202 to one of the first and second points.

With the installation of the elastic member 215, it is likely to produce an impact or noise at the time when the second housing arrives at the first or second point. That is, the elastic force of the elastic member 205 is maximum at the third point but minimum at the first and second points, whereas the moving velocity of the slide member 204 induced by the elastic force of the elastic member 205 becomes maximum at the first or second point. Therefore, it is desired to dampen the impact or noise generated at the first or second point where the sliding movement of the second housing 202 is stopped. In an exemplary embodiment, shock-absorbing members 243 are provided at both ends of the guide rails to dampen such impact or noise.

Each of the shock-absorbing members 243 has a fastening stud 243b joined to the slide member 204, and a body portion 243a providing a substantial shock-absorbing action. When the shock-absorbing members 243 are arranged on the slide member 204, the body portions 243a are positioned at the ends of the guide rails 241, respectively. Upon arriving at the first or second point, the second housing 202 comes into contact with the guide member 203, more specifically with one end of each of the guide ribs 231. That is, each of the shock-absorbing members 243 is installed at a portion where an end of the corresponding guide rib 231 will come into contact with the shock-absorbing member 243 in the movement area of the second housing 202. Such shock-absorbing members 243 may be installed at the ends of the guide ribs 231.

With the slide-type portable terminal 200 configured as described above, the slide module is positioned only in the opening 229 of the rear case 202a even if the slide module is formed from a metallic material, and the remaining part of the rear case 202a, and the second housing 202, on which the rear case 202a is mounted, can be fabricated through injection molding. Therefore, if the terminal 200 has a mobile communication function, it is possible to suppress the metallic slide module from affecting the operation of one or more antenna devices by positioning the antenna device(s) at one or both ends of the second housing 202.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
a first housing;
a second housing coupled to the first housing to face the first housing, the second housing being linearly movable to expose or cover a part of the first housing;
a rear case coupled to a rear face of the second housing;
an opening formed through the rear case; and
a slide module comprising a guide member mounted on the first housing, a slide member coupled to and linearly movable with respect to the guide member, and at least one biasing member that operatively exerts biasing forces on at least one of the first housing and the second housing so as to urge the portable terminal in an open position when a position of the second housing relative to the first housing is on a first side of a threshold, and so as to urge the portable terminal in a closed position when the position of the second housing relative to the first housing is on a second side of the threshold,
wherein the slide member is fitted to an inner surface of the rear case and is positioned in the opening to close the rear face of the second housing.

2. The portable terminal as claimed in claim 1, further comprising:
fastening pieces extending from at least one side edge of the slide member;
fastening holes formed adjacent to edges of the opening on an inner surface of the rear case; and
screws extending through the fastening pieces and fitted to the fastening holes, respectively, to fasten the slide member to the rear case.

3. The portable terminal as claimed in claim 1, wherein the slide module further comprises:
a pair of guide rails formed on one surface of the slide member; and
a pair of guide ribs respectively formed at side ends of the guide member, the guide ribs being slidably engaged with the guide rails in a state in which the guide ribs wrap the guide rails, respectively.

4. The portable terminal as claimed in claim 3, wherein the guide rails are exposed to a rear surface of the second housing through the opening.

5. The portable terminal as claimed in claim 3, wherein the slide module further comprises shock-absorbing members respectively mounted on ends of the guide rails, the guide member coming into contact with the shock-absorbing members as the slide member is slid and arrives at one end of the guide rails.

6. The portable terminal as claimed in claim 5, wherein each of the shock-absorbing members comprises a fastening stud and a body portion.

7. The portable terminal as claimed in claim 3, wherein the slide module further comprises shock-absorbing members respectively mounted on ends of the guide ribs, the slide member coming into contact with the shock-absorbing members as the slide member is slid and arrives at one end of the guide rails.

8. The portable terminal as claimed in claim 7, wherein each of the shock-absorbing members comprises a fastening stud and a body portion.

9. The portable terminal as claimed in claim 1, wherein the at least one biasing member corresponds to at least one elastic member, one end of which is supported on the guide member, and the other end of which is supported on the slide member, the at least one elastic member providing an elastic force for urging both ends of the at least one elastic member away from each other.

10. A portable terminal comprising:
   a first housing;
   a second housing coupled to the first housing to face the first housing, the second housing being linearly movable to expose or cover a part of the first housing;
   a rear case coupled to a rear face of the second housing;
   an opening formed through the rear case; and
   a slide module comprising a guide member mounted on the first housing, a slide member coupled to and linearly movable with respect to the guide member, and at least one biasing member that operatively exerts biasing forces on at least one of the first housing and the second housing so as to urge the portable terminal in an open position when a position of the second housing relative to the first housing is on a first side of a threshold, and so as to urge the portable terminal in a closed position when the position of the second housing relative to the first housing is on a second side of the threshold,
   wherein the slide member is fitted to an inner surface of the rear case and is positioned in the opening in such a manner that the rear case surrounds a periphery of the slide member.

11. The portable terminal as claimed in claim 10, wherein the width of the slide member in a sliding direction of the second housing is less than the width of the rear case in the sliding direction of the second housing.

12. The portable terminal as claimed in claim 10, further comprising:
   fastening pieces extending from at least one side edge of the slide member;
   fastening holes formed adjacent to edges of the opening on an inner surface of the rear case; and
   screws extending through the fastening pieces and fitted to the fastening holes, respectively, to fasten the slide member to the rear case.

13. The portable terminal as claimed in claim 10, wherein the slide module further comprises:
   a pair of guide rails formed on one surface of the slide member; and
   a pair of guide ribs respectively formed at side end parts of the guide member,
   wherein the guide ribs are slidably engaged with the guide rails in a state in which the guide ribs wrap the guide rails, respectively.

14. The portable terminal as claimed in claim 13, wherein the slide module further comprises shock-absorbing members respectively mounted on ends of the guide rails, the guide member coming into contact with the shock-absorbing members as the slide member is slid and arrives at one end of the guide rails.

15. The portable terminal as claimed in claim 14, wherein each of the shock-absorbing members comprises a fastening stud and a body portion.

16. The portable terminal as claimed in claim 13, wherein the slide module further comprises shock-absorbing members respectively mounted on ends of the guide ribs, the slide member coming into contact with the shock-absorbing members as the slide member is slid and arrives at one end of the guide rails.

17. The portable terminal as claimed in claim 16, wherein each of the shock-absorbing members comprises a fastening stud and a body portion.

18. A portable terminal comprising:
   a first housing;
   a second housing coupled to the first housing to face the first housing, the second housing being linearly movable to expose or cover a part of the first housing;
   a rear case coupled to a rear face of the second housing;
   an opening formed through the rear case; and
   a slide module comprising a guide member mounted on the first housing, a slide member coupled to and linearly movable with respect to the guide member, a pair of guide rails formed on one surface of the slide member, and a pair of guide ribs respectively formed at side ends of the guide member, the guide ribs being slidably engaged with the guide rails in a state in which the guide ribs wrap the guide rails, respectively,
   wherein the slide member is fitted to an inner surface of the rear case and is positioned in the opening to close the rear face of the second housing.

19. The portable terminal as claimed in claim 18, wherein the slide module further comprises shock-absorbing members respectively mounted on ends of the guide rails, the guide member coming into contact with the shock-absorbing members as the slide member is slid and arrives at one end of the guide rails.

20. A portable terminal comprising:
   a first housing;
   a second housing coupled to the first housing to face the first housing, the second housing being linearly movable to expose or cover a part of the first housing;
   a rear case coupled to a rear face of the second housing;
   an opening formed through the rear case;
   a slide module comprising a guide member mounted on the first housing, and a slide member coupled to and linearly movable with respect to the guide member;
   a pair of guide rails formed on one surface of the slide member;
   a pair of guide ribs respectively formed at side end parts of the guide member,
   wherein the slide member is fitted to an inner surface of the rear case and is positioned in the opening in such a manner that the rear case surrounds a periphery of the slide member, and
   wherein the guide ribs are slidably engaged with the guide rails in a state in which the guide ribs wrap the guide rails, respectively.

* * * * *